United States Patent
Yoshizawa

(10) Patent No.: US 6,789,138 B1
(45) Date of Patent: Sep. 7, 2004

(54) COMPUTER PERIPHERAL APPARATUS AND A COMPUTER READABLE MEDIUM HAVING A PROGRAM FOR CONTROLLING THE COMPUTER PERIPHERAL APPARATUS

(75) Inventor: Motoki Yoshizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 452 days.

(21) Appl. No.: 09/610,290

(22) Filed: Jul. 5, 2000

(30) Foreign Application Priority Data

Jul. 6, 1999 (JP) .......................................... 11-191635

(51) Int. Cl.[7] .............................................. G06F 3/00
(52) U.S. Cl. ................................ 710/16; 710/3; 710/9; 710/15; 710/62; 710/72; 710/129; 719/321
(58) Field of Search ............................... 710/1–3, 8–10, 710/15, 16, 62–64, 72, 101, 104, 129, 131, 100, 73, 74; 713/1, 2, 100; 709/301; 701/301; 719/321

(56) References Cited

U.S. PATENT DOCUMENTS

| | | | |
|---|---|---|---|
| 4,476,522 | * 10/1984 | Bushaw et al. ............. 711/153 |
| 4,787,030 | * 11/1988 | Harter et al. .................. 711/5 |
| 5,274,765 | 12/1993 | Le Gallo |
| 5,790,884 | * 8/1998 | Weinman et al. .............. 710/4 |
| 5,835,760 | * 11/1998 | Harmer .......................... 713/2 |
| 5,842,041 | * 11/1998 | McKee et al. ................. 710/23 |
| 5,872,998 | * 2/1999 | Chee ............................ 710/56 |
| 5,944,806 | * 8/1999 | Melvin et al. .............. 710/310 |
| 6,145,046 | * 11/2000 | Jones .......................... 710/129 |
| 6,182,204 | * 1/2001 | Nakashima ................... 712/38 |
| 6,209,042 | * 3/2001 | Yanagisawa et al. .......... 710/3 |
| 6,292,863 | * 9/2001 | Terasaki et al. ............ 710/129 |
| 6,446,139 | * 9/2002 | Leung et al. .................. 710/1 |
| 6,480,948 | * 11/2002 | Virajpet et al. ............. 711/202 |

FOREIGN PATENT DOCUMENTS

| | | |
|---|---|---|
| EP | 0 417 7744 | 6/1992 |
| EP | 0 686 937 A | 12/1995 |
| JP | A-64-31217 | 2/1989 |

* cited by examiner

Primary Examiner—Jeffrey Gaffin
Assistant Examiner—Tanh Nguyen
(74) Attorney, Agent, or Firm—Oliff & Berridge, PLC

(57) ABSTRACT

Firmware has a plurality of interface modules for mutually transferring signals between a CPU (11) and a plurality of mutually different interface units (40, 41), the type of controller (40a, 41a) is identified by an identifying module, and the CPU (11) is operated by using one of the interface modules corresponding to the controller (40a, 41a). Since the assignment of the controllers (40a, 41a) in memory space of the CPU (11) is different in accordance with the types of the interface units (40, 41), the type of the interface unit (40, 41) can be identified by a return value at a time when data is written in a certain region of the memory space, so that the CPU (11) can be operated in accordance with the type of the interface unit (40, 41).

12 Claims, 4 Drawing Sheets

COMPUTER PERIPHERAL APPARATUS AND A COMPUTER READABLE MEDIUM HAVING A PROGRAM FOR CONTROLLING THE COMPUTER PERIPHERAL APPARATUS

BACKGROUND OF THE INVENTION

1. Field of the Invention

The present invention relates to a computer peripheral apparatus having both a central processing unit (hereafter, the "central processing unit" will be referred to as the "CPU") which is operated on the basis of firmware stored in a nonvolatile memory and an interface which can be connected to a computer. More particularly, the present invention relates to a computer peripheral apparatus in which mutually different interfaces can be mounted, and relates to a computer readable medium having a program for controlling the computer peripheral apparatus.

The present application is based on Japanese Patent Application No. Hei. 11-191635, which is incorporated herein by reference.

2. Description of the Related Art

A scanner, a printer, and the like are known as peripheral apparatuses which can be connected to a computer and have CPUs. In such a peripheral apparatus, firmware for operating the CPU is generally stored in a nonvolatile memory. In addition, in recent years, interfaces for connecting a computer and its peripheral apparatuses have come to be diversified. For example, a scanner can be connected to the computer by a SCSI, a USB, IEEE 1394, and the like.

However, in a conventional peripheral apparatus having an erasable programmable read only memory (EPROM) as a nonvolatile memory, EPROMs storing firmware need to be prepared in a number corresponding to the number of types of interfaces, and different EPROMs need to be mounted for the respective types having different interfaces. Further, in recent years, firmware of the peripheral apparatus has come to be stored in a flash memory which is rewritable in the state of being mounted on a board. In a case where firmware which is different for each interface is stored in the flash memory, it is also necessary to prepare firmware in a number corresponding to the number of types of interfaces, and write the firmware in correspondence with the types of interfaces. For this reason, with conventional peripheral apparatuses, there has been a problem in that the development of firmware for each interface and management of supply thereof become complicated.

SUMMARY OF THE INVENTION

The present invention has been devised to overcome the above-described problem, and its object is to provide a computer peripheral apparatus which can be operated by the same firmware even if the interface is different.

According to the first aspect of the present invention, there is provided a computer peripheral apparatus comprising a central processing unit, a plurality of interface units of different types including controllers which control data transfer between a computer and the central processing unit, a plurality of controlling devices, one of which mutually transfers signals between the central processing unit and one of the plurality of interface units, and an identifying device which identifies a type of one of the controllers, and which operates the central processing unit by using one of the plurality of controlling devices that corresponds to the one of the controllers. For example, in a case where firmware including a plurality of modules corresponding to the plurality of controlling devices and a module corresponding to the identifying device is stored in a nonvolatile memory, it is unnecessary to replace the nonvolatile memory in correspondence with the interface unit. In addition, since the computer peripheral apparatus having the same function but having a different interface unit can be operated by the same firmware, the development of firmware and management of supply thereof are facilitated.

According to the second aspect of the present invention, it is preferable that the identifying device writes a value in a predetermined region of memory space of the central processing unit, and identifies the type of one of the controllers by a return value which is obtained by reading data from the predetermined region of the memory space of the central processing unit. Accordingly, the controlling device can be selected in accordance with the type of the interface unit by making use of the fact that the assignment of controllers in the memory space, the numbers of registers, or the attributes of the registers differ in the interface units of different types, so as to operate the central processing unit.

According to the third aspect of the present invention, it is preferable that the controllers of the plurality of interface units are assigned to respective regions in the memory space of the central processing unit which are mutually different. Accordingly, even if the numbers, attributes, and the like of the registers in the interface units of different types are the same, the controlling device can be selected in accordance with the type of the interface unit, so as to operate the central processing unit.

According to the fourth aspect of the present invention, it is preferable that the plurality of interface units have registers in the respective controllers, and wherein numbers of the registers are mutually different. Accordingly, even if the assignments of controllers in the memory space are identical in the interface units of different types, the computer peripheral apparatus is able to select the controlling device in accordance with the type of the interface unit, so as to operate the central processing unit.

According to the fifth aspect of the present invention, it is preferable that the plurality of interface units have registers in the respective controllers, and wherein attributes of the registers are mutually different. Accordingly, even if the assignments of controllers in the memory space are identical in the interface units of different types, and even if the numbers of the registers are identical, the computer peripheral apparatus is able to select the controlling device in accordance with the type of the interface unit, so as to operate the central processing unit.

According to the sixth aspect of the present invention, it is preferable that the plurality of interface units receive different inputs thereto from the central processing unit. Accordingly, even if the numbers and attributes of the registers, assignments of memory space, and the like for the interface units of different types are the same, the controlling device can be selected in accordance with the type of the interface unit, so as to operate the central processing unit.

According to the seventh aspect of the present invention, there is provided a computer readable medium having a program stored thereon for controlling a computer peripheral apparatus which includes a central processing unit and a plurality of interface units of different types including controllers which control data transfer between a computer and the central processing unit. The program comprises the steps of mutually transferring signals between the central processing unit and one of the plurality of interface units, identifying a type of one of the controllers, and operating the central processing unit in accordance with the type of one of the controllers identified in the identifying step. For example, in a case where firmware including a plurality of modules for mutually transferring signals between the central processing unit and one of the plurality of interface units and a module for identifying a type of one of the controllers and operating the central processing unit in accordance with the type of one of the controllers is stored in a nonvolatile memory through a computer readable medium, it is unnecessary to replace the firmware in correspondence with the interface unit. In addition, since the computer peripheral apparatus having the same function but having a different interface unit can be operated by the same firmware, the development of firmware and management of supply thereof are facilitated.

According to the eighth aspect of the present invention, it is preferable that the identifying step comprising writing a value in a predetermined region of memory space of the central processing unit; and identifying the type of one of the controllers by a return value which is obtained by reading data from the predetermined region of the memory space of the central processing unit. Accordingly, the controlling procedure can be selected in accordance with the type of the interface unit by making use of the fact that the assignment of controllers in the memory space, the numbers of registers, or the attributes of the registers differ in the interface units of different types, so as to operate the central processing unit.

According to the ninth aspect of the present invention, the above-described program may be stored in the computer through a communication means, and the program can be written in the computer peripheral apparatus by the computer.

According to the tenth aspect of the present invention, the computer readable medium of the seventh aspect of the present invention may be considered in combination with the computer peripheral apparatus of the first aspect of the present invention. That is, there may be provided a computer readable medium having a program stored thereon for controlling a computer peripheral apparatus which includes a central processing unit, a plurality of interface units of different types including controllers which control data transfer between a computer and the central processing unit, a plurality of controlling devices, and an identifying device, wherein the program causes one of the plurality of controlling devices to mutually transfer a signal between the central processing unit and one of the plurality of interface units, and wherein the program causes the identifying device to identify a type of one of the controllers and operate the central processing unit by using one of the plurality of controlling devices that corresponds to the one of the controllers.

According to the eleventh aspect of the present invention, it is preferable that the program causes the identifying device to write a value in a predetermined region of memory space of the central processing unit and identify the type of one of the controllers by a return value which is obtained by reading data from the predetermined region of the memory space of the central processing unit.

According to the twelfth aspect of the present invention, there is provided a data signal for storing the above-described program in the computer.

BRIEF DESCRIPTION OF THE DRAWINGS

FIGS. 1A and 1B are schematic diagrams for explaining the operation of a scanner in accordance with a first embodiment of the present invention, in which FIG. 1A illustrates a state in which a SCSI-compatible interface unit has been mounted, and FIG. 1B illustrates a state in which an IEEE 1394-compatible interface unit has been mounted;

FIGS. 4A and 4B are schematic diagrams for explaining the operation of a scanner in accordance with a second embodiment of the present invention, in which FIG. 4A illustrates a state in which the SCSI-compatible interface unit has been mounted, and FIG. 4B illustrates a state in which the IEEE1394-compatible interface unit has been mounted; and FIGS. 5A and 5B are schematic diagrams for explaining the operation of a scanner in accordance with a third embodiment of the present invention, in which FIG. 5A illustrates a state in which the SCSI-compatible interface unit has been mounted, and FIG. 5B illustrates a state in which the IEEE 1394-compatible interface unit has been mounted.

DETAILED DESCRIPTION OF THE PREFERRED EMBODIMENTS

Hereafter, a description will be given of embodiments illustrating the mode for carrying out the present invention.

1. First Embodiment

Figure 2:
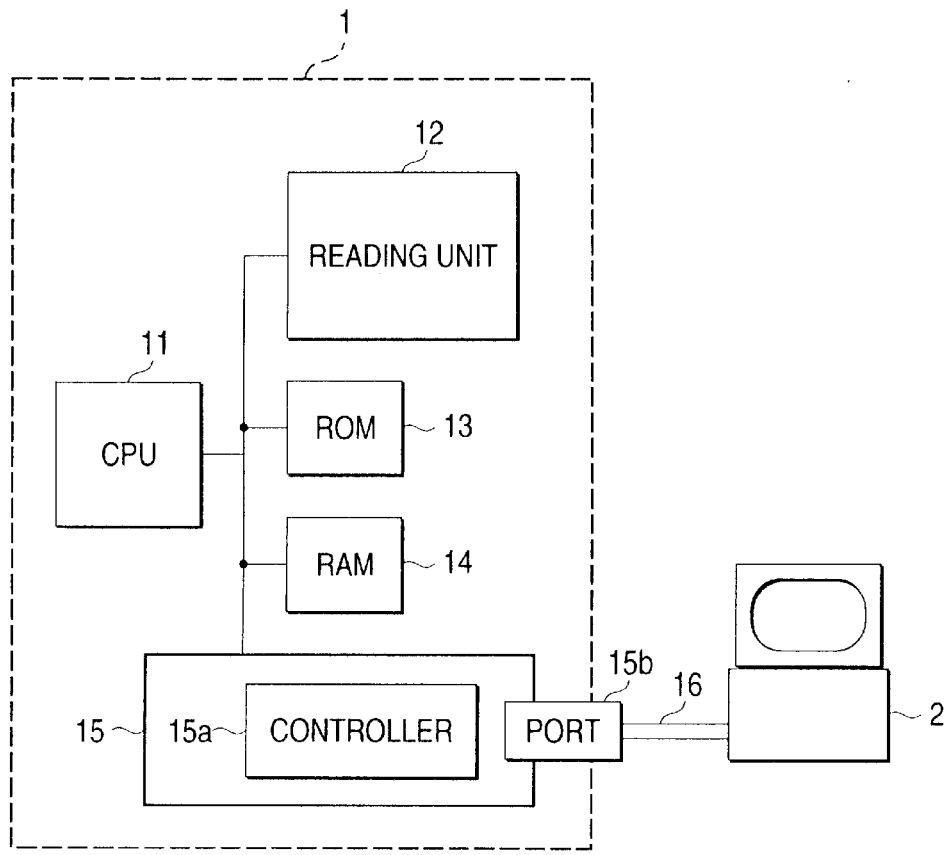
FIG. 2 is a block diagram illustrating a scanner in accordance with a first embodiment of the present invention.

FIG. 2 shows a configuration of hardware in accordance with a first embodiment to which the present invention is applied to a scanner. A scanner 1 is a computer peripheral apparatus which transmits image data to a computer 2 by using an unillustrated CCD.

The scanner 1 has a CPU 11, a reading unit 12, a read only memory (ROM) 13, a random access memory (RAM) 14, and an interface unit 15. The CPU 11, the reading unit 12, the read only memory (ROM) 13, the random access memory (RAM) 14, and the interface unit 15 are stored in an unillustrated casing. An external connection port 15b of the interface unit 15 is exposed on the outer side of the casing, and is connected to the computer 2 by a cable 16.

The reading unit 12 has an unillustrated reciprocatable carriage, and outputs the brightness of each pixel of an original as image data by the CCD stored in the carriage. The CPU 11 is connected to a controller of such as the reading unit 12 through an unillustrated chip select, and controls the overall scanner 1. The RAM 14 temporarily stores the image data outputted from the reading unit 12. The ROM 13 which is a nonvolatile memory is a UV-EPROM, and firmware for operating the CPU 11 is stored therein. The nonvolatile memory may be a flash memory. In a case where the flash memory is used as the nonvolatile memory, and firmware is provided by a computer readable medium such as a floppy disk, the rewriting of the firmware in the state in which the flash memory is mounted on a board becomes possible. In addition, the downloading of firmware becomes possible through a communication line by using a communication means such as the Internet.

The interface unit 15 has a controller 15a for controlling the transfer of data between the computer 2 and the CPU 11, as well as the external connection port 15b. The CPU 11 controls the controller 15a of the interface unit 15 in accordance with a memory-mapped I/O system. Two kinds of interface units are prepared as interface units which can be mounted in the scanner 1. One is a SCSI-compatible interface unit having a SCSI port, and the other is an IEEE 1394-compatible interface unit having an IEEE 1394 port. The controller of the SCSI-compatible interface unit and the controller of the IEEE 1394-compatible interface unit have mutually different assigned regions in memory space. Namely, the chip selects of the CPU 11 to which the respective controllers are assigned are different. A description has been given above of the configuration of hardware in accordance with the first embodiment.

Figure 3:
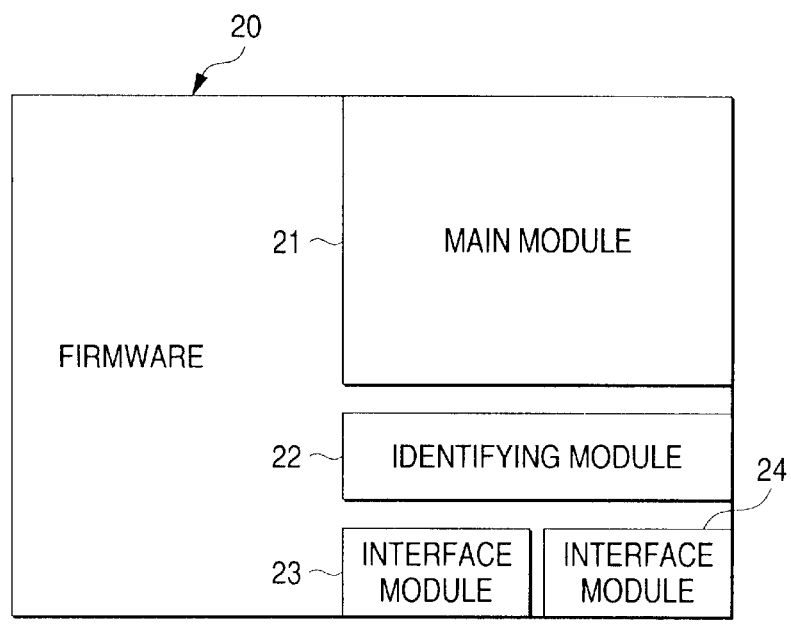
FIG. 3 is a block diagram illustrating firmware of the scanner in accordance with the first embodiment of the present invention.

FIG. 3 shows the configuration of software of the firmware. Firmware 20 includes a main module 21, an identifying module 22, and interface modules 23 and 24.

Of the modules for controlling the CPU 11, the main module 21 is a module which is not dependent on the interface unit 15, and is a module for operating the CPU 11 to control the overall scanner 1.

The identifying module 22 serving as an identifying device is a module which writes a value in a predetermined region of the memory space during the starting of the scanner 1, identifies the type of the interface unit 15 by its return value, and selects either the interface module 23 or 24 depending on the type of the interface unit 15, so as to operate the CPU 11.

Of the modules for controlling the CPU 11, the interface modules 23 and 24 serving as controlling devices are modules which operate the CPU 11 depending on the type of the interface unit 15 and mainly cause the CPU 11 to issue a command to the controller 15a. The interface module 23 controls the SCSI-compatible interface unit, while the interface module 24 controls the IEEE 1394-compatible interface unit. A description has been given above of the configuration of software in accordance with the first embodiment.

Next, a description will be given of the operation of the scanner in accordance with the first embodiment.

When the scanner 1 is started, the CPU 11 writes data in a predetermined region of the memory space by the identifying module 22. When the region where the data is written by the CPU 11 and the region of the memory space assigned to an I/O register of the controller 15a coincide with each other, if the CPU 11 reads out the data from that region, a valid return value is acquired. Meanwhile, when the region where the data is written by the CPU 11 and the region of the memory space assigned to the I/O register of the controller 15a do not coincide with each other, if the CPU 11 reads out the data from that region, an invalid return value is acquired.

Figure 1A:
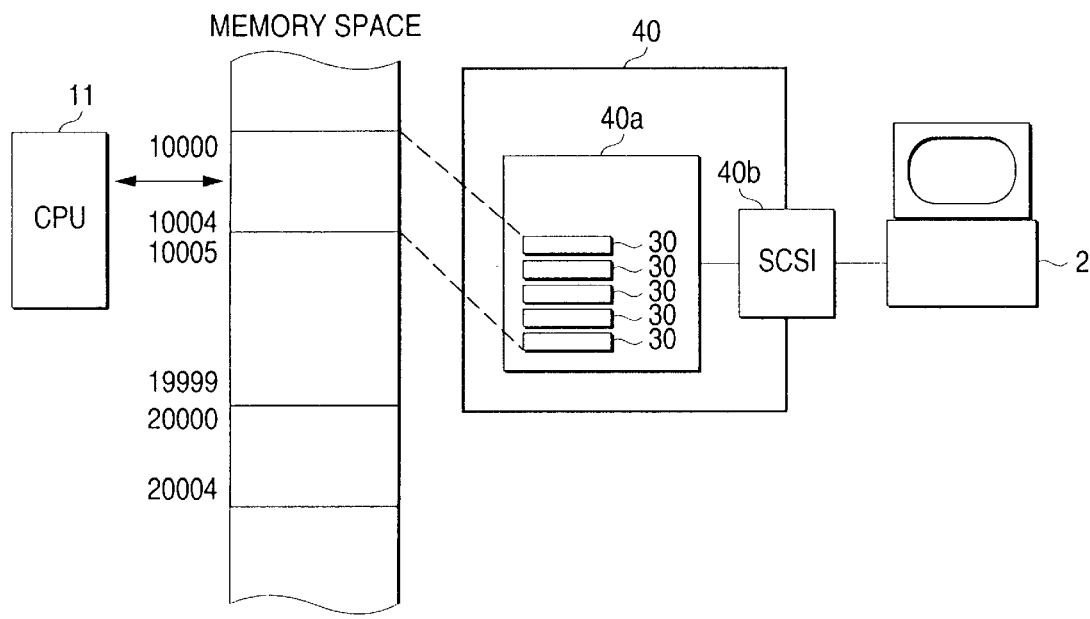
Figure 1B:
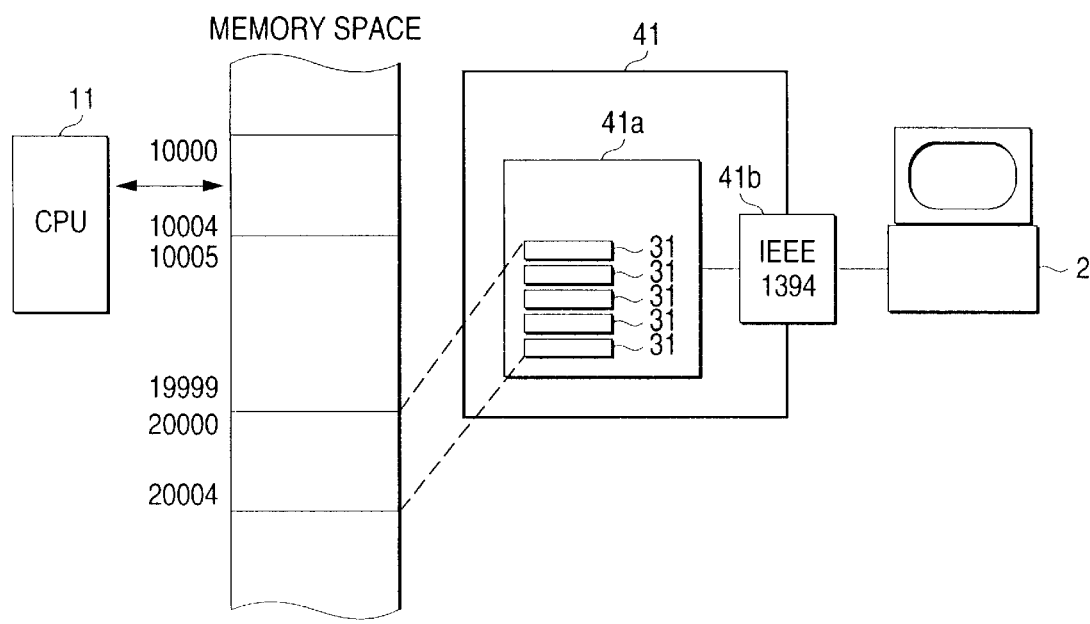

For example, it is assumed that, as shown in FIGS. 1A and 1B, an assigned region in the memory space of a controller 40a of a SCSI-compatible interface unit 40 having a SCSI port 40b is a region having addresses 10000 through 10004, while an assigned region in the memory space of a controller 41a of an IEEE 1394-compatible interface unit 41 having an IEEE 1394 port 41b is a region having addresses 20000 through 20004. Further, it is assumed that a region in the memory space where the CPU 11 writes data by the identifying module 22 is always a region having an address 10000.

(1) As shown in FIG. 1A, in a case where the SCSI-compatible interface unit 40 is mounted in the scanner 1, the CPU 11 writes data in a region having the address 10000 in the memory space by the identifying module 22. Then, when acquiring a return value, the CPU 11 acquires a valid return value.

(2) As shown in FIG. 1B, in a case where the IEEE 1394-compatible interface unit 41 is mounted in the scanner 1, the CPU 11 writes data in a region having the address 10000 in the memory space by the identifying module 22. Then, when acquiring a return value, the CPU 11 acquires an invalid return value since nothing is connected to the chip select corresponding to the region having the addresses 10000 to 19999.

As described in items (1) and (2) above, if the regions in the memory space which are assigned to I/O registers 30 and 31 of the controllers 40a and 41a are changed in advance between the SCSI-compatible interface unit 40 and the IEEE 1394-compatible interface unit 41, return values at the time when the identifying module 22 is executed differ. Accordingly, the CPU 11 identifies the type of the interface unit mounted in the scanner 1 by its return value.

When the type of the interface unit 15 mounted in the scanner 1 is identified, the identifying module 22 operates the CPU 11 on the basis of either module corresponding to the type of the interface unit 15 between the interface modules 23 and 24. For this reason, a signal is transmitted from the CPU 11 to the controller 15a in accordance with the type of the interface unit 15, and a signal transmitted from the controller 15a is processed by the CPU 11.

With the scanner 1 in accordance with the first embodiment of the present invention, it is possible to operate the CPU 11 of the scanner in which the SCSI-compatible interface unit or the IEEE 1394-compatible interface unit is mounted by using single firmware. For this reason, it is unnecessary to replace the ROM 13 in accordance with the type of the interface unit. Therefore, it is unnecessary to manage the firmware for each type of the interface unit. In addition, since the interface modules 23 and 24 have sufficiently small data sizes as compared with the main module 21, the amount of memory space consumed by recording a plurality of interface modules in the ROM 13 is very small.

2. Second Embodiment

In a second embodiment in which the present invention is applied to a scanner, assigned regions in the memory space of the controllers of the interface units are identical between the SCSI-compatible interface unit and the IEEE 1394-compatible interface unit. Hereafter, portions which are substantially identical to those of the first embodiment will be denoted by the same reference numerals, and a description thereof will be omitted.

In the second embodiment, the SCSI-compatible interface unit and the IEEE 1394-compatible interface unit have the same chip select for connection to the CPU 11. Namely, their assigned regions in the memory space are identical. Meanwhile, the SCSI-compatible interface unit and the IEEE 1394-compatible interface unit have different numbers of I/O registers of their respective controllers.

The identifying module is a module which writes a value in the memory space assigned to the I/O register of the controller 15a during the starting of the scanner, identifies the type of the interface unit 15 by its return value, and selects either the interface module 23 or 24 depending on the type of the interface unit 15, so as to operate the CPU 11.

Next, a description will be given of the operation of the scanner in accordance with the second embodiment.

When the scanner is started, the CPU 11 writes data at a predetermined address in the region assigned to the controller 15a in the memory space by the identifying module. When an I/O register of the controller 15a has been assigned to the region where the data is written by the CPU 11, if the CPU 11 reads out the data from that region, a valid return value is acquired. Meanwhile, when the I/O register of the controller 15*a* has not been assigned to the region where the data is written by the CPU 11, if the CPU 11 reads out the data from that region, an invalid return value is acquired.

Figure 4A:
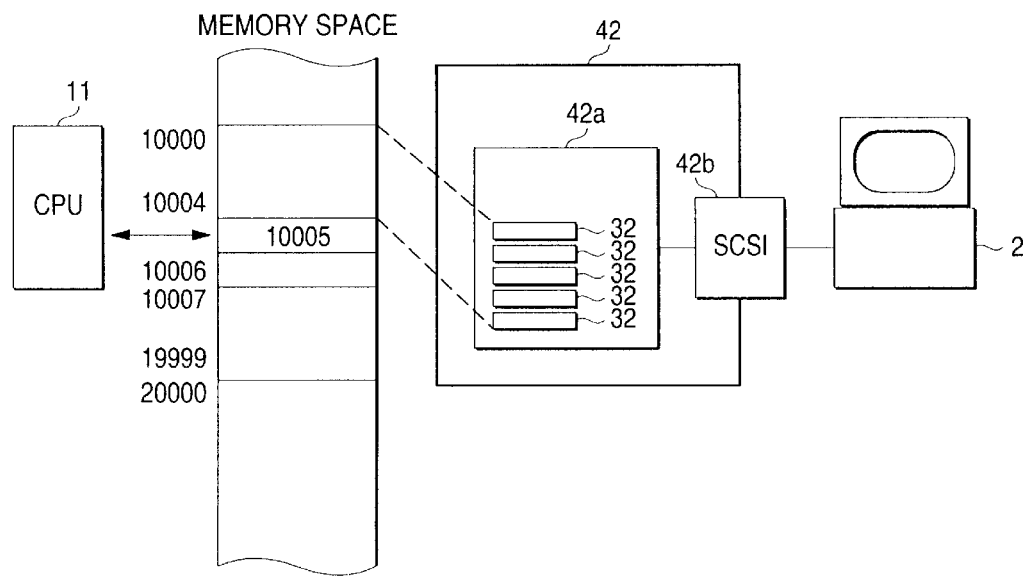
Figure 4B:
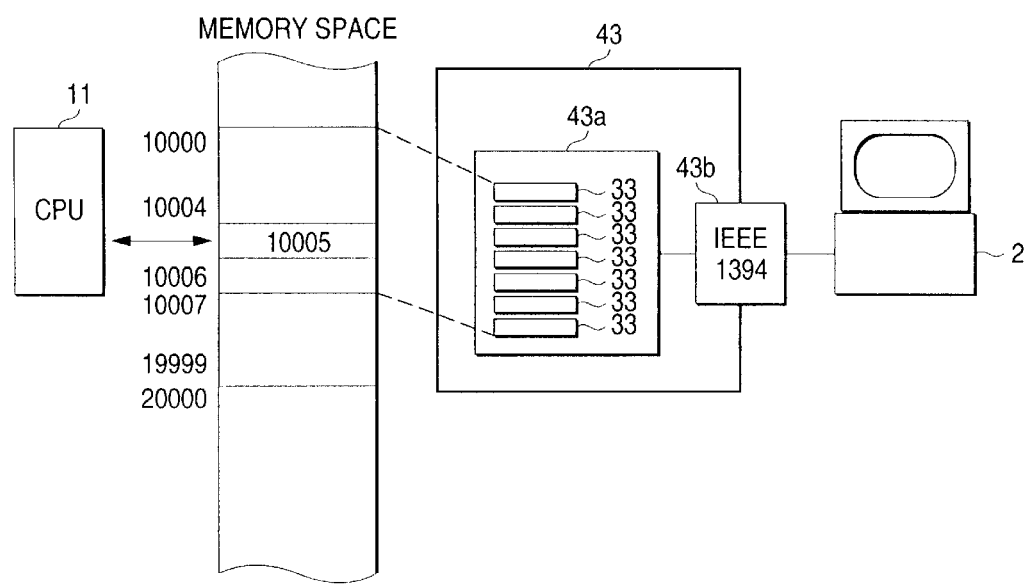

For example, it is assumed that, as shown in FIGS. 4A and 4B, five registers 32 provided in a controller 42*a* of a SCSI-compatible interface unit 42 having a SCSI port 42*b* is assigned to addresses 10000 through 10004 in the memory space, while seven registers 33 provided in a controller 43*a* of an IEEE 1394-compatible interface unit 43 having an IEEE 1394 port 43*b* is assigned to addresses 10000 through 10006. Further, it is assumed that the CPU 11 writes data in a region having an address 10005 in the memory space by the identifying module.

(1) As shown in FIG. 4A, in a case where the SCSI-compatible interface unit 42 is mounted in the scanner, the CPU 11 writes data at the address 10005 in the memory space by the identifying module. Then, when acquiring a return value, the CPU 11 acquires an invalid return value since the I/O register 32 assigned to the region at the address 10005 is not present.

(2) As shown in FIG. 4B, in a case where the IEEE 1394-compatible interface unit 43 is mounted in the scanner, the CPU 11 writes data at the address 10005 in the memory space by the identifying module. Then, when acquiring a return value, the CPU 11 acquires a valid return value.

As described in items (1) and (2) above, if the numbers of registers 32 and 33 provided in the controllers are changed in advance between the SCSI-compatible interface unit and the IEEE 1394-compatible interface unit, return values at the time when the identifying module is executed differ. Accordingly, the CPU 11 identifies the type of the interface unit mounted in the scanner by its return value.

With the scanner in accordance with the second embodiment of the present invention, even if the regions in the memory space assigned to the interface units of different types are identical, the identifying module is able to identify the types of the interface units. For this reason, it is unnecessary to assign a plurality of chip selects of the CPU 11 to the controllers of the interface units. Accordingly, the number of controllers other than the interface unit 15 controlled by the CPU 11 can be increased, as required.

3. Third Embodiment

In a third embodiment in which the present invention is applied to a scanner, assigned regions in the memory space of the controllers of the interface units are identical between the SCSI-compatible interface unit and the IEEE 1394-compatible interface unit. Hereafter, portions which are substantially identical to those of the first embodiment will be denoted by the same reference numerals, and a description thereof will be omitted.

In the third embodiment, the SCSI-compatible interface unit and the IEEE 1394-compatible interface unit have the same chip select for connection to the CPU 11. Namely, their assigned regions in the memory space are identical. In addition, the SCSI-compatible interface unit and the IEEE 1394-compatible interface unit have the same numbers of registers of their respective controllers. Meanwhile, the attributes of the registers differ from each other.

The identifying module is a module which writes a value in the memory space assigned to the I/O register of the controller 15*a* during the starting of the scanner, identifies the type of the interface unit 15 by its return value, and selects either the interface module 23 or 24 depending on the type of the interface unit 15, so as to operate the CPU 11.

Next, a description will be given of the operation of the scanner in accordance with the third embodiment.

When the scanner is started, the CPU 11 writes data at a predetermined address in the region assigned to the I/O register of the controller 15*a* in the memory space by the identifying module. A return value which differs from the written data is acquired depending on the attribute of the register into which the data is written by the CPU 11.

Figure 5A:
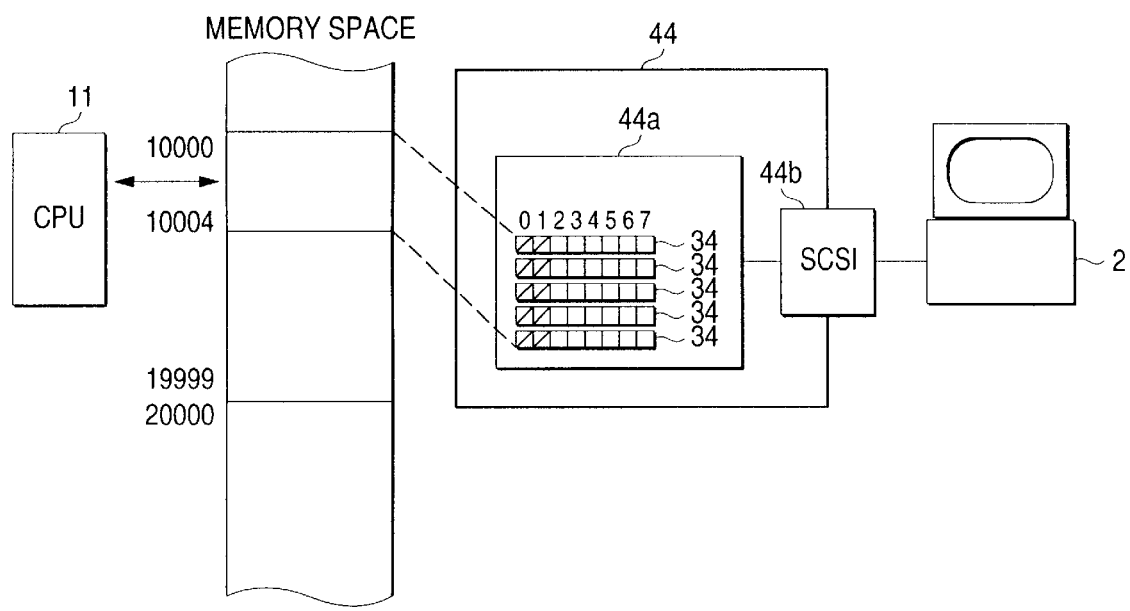
Figure 5B:
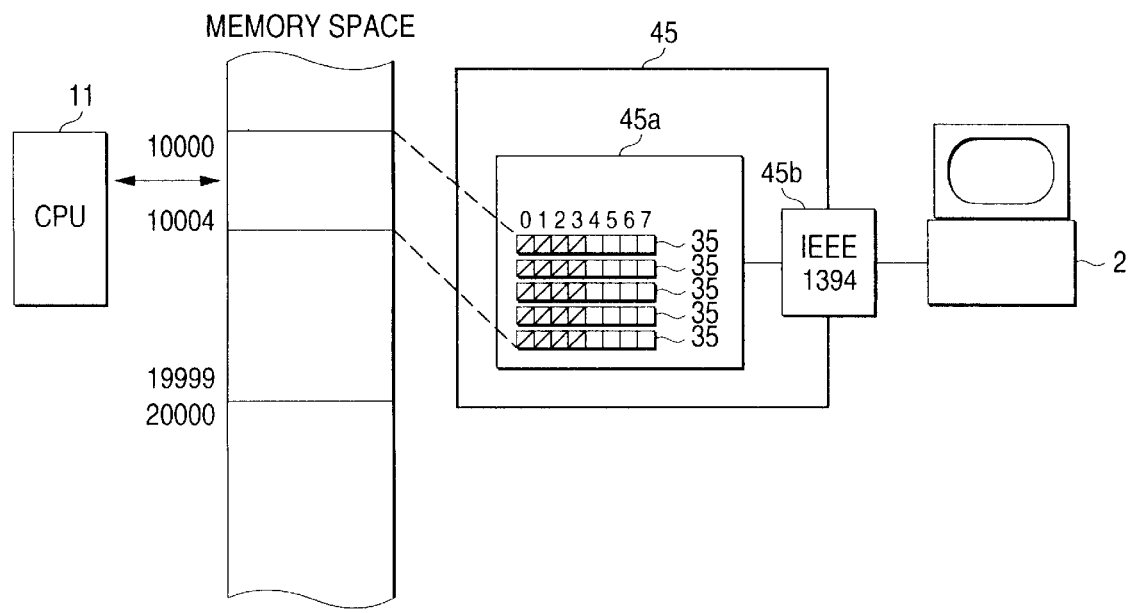

For example, it is assumed that, as shown in FIGS. 5A and 5B, five registers 34 provided in a controller 44*a* of a SCSI-compatible interface unit 44 having a SCSI port 44*b* and five registers 35 provided in a controller 45*a* of an IEEE 1394-compatible interface unit 45 having an IEEE 1394 port 45*b* both have 8-bit register lengths, and that the registers 34 and 35 are respectively assigned to addresses 10000 to 10004 in the memory space. Further, it is assumed that the first two bits of each register 34 are exclusively used for reading, and are always adapted to return values of zeros. Meanwhile, it is assumed that the first four bits of each register 35 are exclusively used for reading, and are always adapted to return values of zeros.

(1) As shown in FIG. 5A, in a case where the SCSI-compatible interface unit 44 is mounted in the scanner, the CPU 11 writes data consisting of "00010011" at the address 10000 in the memory space by the identifying module. Then, when acquiring a return value, the CPU 11 acquires a return value consisting of "00010011".

(2) As shown in FIG. 51B in a case where the IEEE 1394-compatible interface unit 45 is mounted in the scanner, the CPU 11 writes data consisting of "00010011" at the address 10000 in the memory space by the identifying module. Then, when acquiring a return value, the CPU 11 acquires a return value consisting of "00000011".

As described in items (1) and (2) above, if the attributes of registers 34 and 35 provided in the controllers are changed in advance between the SCSI-compatible interface unit 44 and the IEEE 1394-compatible interface unit 45, return values at the time when the identifying module is executed differ. Accordingly, the CPU 11 identifies the is type of the interface unit 15 mounted in the scanner by its return value. In addition to the above-described example, the accessing method for the CPU 11 and the I/O register may be based on word accessing in one interface unit so as to change the attributes of the registers, With the scanner in accordance with the third embodiment of the present invention, even if the regions in the memory space assigned to the interface units of different types are identical, the identifying module is able to identify the types of the interface units. For this reason, it is unnecessary to assign a plurality of chip selects of the CPU 11 to the controllers of the interface units. Accordingly, the number of controllers other than the interface unit 15 controlled by the CPU 11 can be increased. Further, even if the numbers of I/O registers of the interface units of different types are identical, the identifying module is able to identify the type of the interface unit.

4. Fourth Embodiment

In a fourth embodiment in which the present invention is applied to a scanner, assigned regions in the memory space of the controllers of the interface units are identical between the SCSI-compatible interface unit and the IEEE 1394-compatible interface unit. Hereafter, portions which are substantially identical to those of the first embodiment will be denoted by the same reference numerals, and a description thereof will be omitted.

In the fourth embodiment, the SCSI-compatible interface unit and the IEEE 1394-compatible interface unit have the same chip select for connection to the CPU 11. Namely, their assigned regions in the memory space are identical. In addition, as for the SCSI-compatible interface unit and the IEEE 1394-compatible interface unit, both the numbers and attributes of the I/O registers of their controllers are the same. Meanwhile, inputs to the interface unit 15 of the CPU 11 differ.

For example, the input to the terminal of an I/O port Pxx is set to high level for the SCSI-compatible interface unit, while the input to the terminal of an I/O port Pxx is set to low level for the IEEE 1394-compatible interface unit If the input to the interface unit 15 of the CPU 11 is thus made different between the SCSI-compatible to interface unit and the IEEE 1394-compatible interface unit, the return values at the time when the identifying module is executed differ. Accordingly, it is possible to identify the type of the interface unit 15 mounted in the scanner by its return value.

Although in the first to fourth embodiments a description has been given above of the scanner, the present invention is also applicable to other computer peripheral apparatuses such as a printer.

What is claimed is:

1. A computer peripheral apparatus, comprising:
  a central processing unit;
  a plurality of interface units of different types including controllers which control data transfer between a computer and the central processing unit;
  a plurality of controlling devices, one of which mutually transfers signals between the central processing unit and one of the plurality of interface units; and
  an identifying device which identifies a type of one of the controllers by a valid return value, and which operates the central processing unit by using one of the plurality of controlling devices that corresponds to the one of the controllers, the return value for a region in a memory space of the central processing unit is determined to be valid when the central processing unit writes data at an address located in the region of the memory space, the address coincides with one of the addresses assigned to separate registers located in the controller of a connected one of the plurality of interface units, and the controllers of the plurality of interface units are assigned to respective ones of the regions, in the memory space of the central processing unit, which are mutually different.

2. A computer peripheral apparatus according to claim 1, the identifying device writes a value in a predetermined region of the memory space of the central processing unit, and identifies the type of one of the controllers by the return value which is obtained by reading data from the predetermined region of the memory space of the central processing unit.

3. A computer peripheral apparatus according to claim 1, the plurality of interface units receive different inputs thereto from the central processing unit.

4. A computer peripheral apparatus according to claim 2, the plurality of interface units receive different inputs thereto from the central processing unit.

5. A computer readable medium having a program stored thereon for controlling a computer peripheral apparatus which includes a central processing unit and a plurality of interface units of different types including controllers which control data transfer between a computer and the central processing unit, the program comprising the steps of:
  mutually transferring signals between the central processing unit and one of the plurality of interface units by a valid return value;
  identifying a type of one of the controllers; and
  operating the central processing unit in accordance with the type of one of the controllers identified in the identifying step, the return value for each region in a memory space of the central processing unit is determined to be valid when the central processing unit writes data at an address located in the region of the memory space, the address coincides with one of the addresses assigned to separate registers located in the controller of a connected one of the plurality of interface units, and the controllers of the plurality of interface units are assigned to respective ones of the regions, in the memory space of the central processing unit, which are mutually different.

6. A computer readable medium according to claim 5, the identifying step comprising:
  writing a value in a predetermined region of the memory space of the central processing unit; and
  identifying the type of one of the controllers by the return value which is obtained by reading data from the predetermined region of the memory space of the central processing unit.

7. A data signal for storing the program according to claim 5 in the computer.

8. A data signal for storing the program according to claim 6 in the computer.

9. A computer readable medium having a program stored thereon for controlling a computer peripheral apparatus which includes a central processing unit, a plurality of interface units of different types including controllers which control data transfer between a computer and the central processing unit, a plurality of controlling devices, and an identifying device, the program causes one of the plurality of controlling devices to mutually transfer a signal between the central processing unit and one of the plurality of interface units, the program, causes the identifying device to identify a type of one of the controllers by a valid return value and operate the central processing unit by using one of the plurality of controlling devices that corresponds to the one of the controllers, the return value for each region in a memory space of the central processing unit is determined to be valid when the central processing unit writes data at an address located in the region of the memory space, the address coincides with one of the addresses assigned to separate registers located in the controller of a connected one of the plurality of interface units, and the controllers of the plurality of interface units are assigned to respective ones of the regions, in the memory space of the central processing unit, which are mutually different.

10. A computer readable medium according to claim 9, the program causes the identifying device to write a value in a predetermined region of the memory space of the central processing unit and identify the type of one of the controllers by the return value which is obtained by reading data from the predetermined region of the memory space of the central processing unit.

11. A data signal for storing the program according to claim 9 in the computer.

12. A data signal for storing the program according to claim 10 in the computer.

* * * * *